United States Patent Office 3,711,273
Patented Jan. 16, 1973

3,711,273
METHOD FOR IMPROVING THE YIELD OF FRUITS
William D. Mitchell, Chadds Ford, Pa., assignor to E. I. du Pont de Nemours and Company, Wilmington, Del.
No Drawing. Continuation of application Ser. No. 809,972, Mar. 24, 1969. This application Oct. 5, 1970, Ser. No. 90,187
The portion of the term of the patent subsequent to Jan. 19, 1988, has been disclaimed
Int. Cl. A01n 9/20, 9/12
U.S. Cl. 71—120                                                     2 Claims

ABSTRACT OF THE DISCLOSURE

Several 1-arylbiurets when applied to various plants at flowering results in an increase in the number and size of fruit set, thereby increasing the yield. The compounds also prolong the life of harvested green leafy vegetables.

---

This application is a continuation of application Ser. No. 809,972 filed Mar. 24, 1969, now abandoned.

BRIEF SUMMARY OF THE INVENTION

Several 1-arylbiurets are useful as plant growth regulants. These biurets can be represented by structure (I):

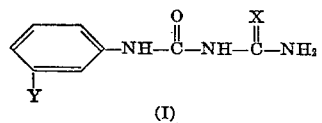

wherein
X is oxygen or sulfur and
Y is hydrogen, fluorine, or methyl.

Representative of the compounds of structure (I) is 1-m-fluorophenylbiuret.

The above compounds are particularly active in improving the yield by promoting the fruit set and increasing the size of fruits on crops such as grapes, peaches, cherries, plums, blueberries, cranberries, apples, citrus fruit, strawberries, pears, prunes, apricots, nectarines, beans, peas, soybeans, tomatoes, melons, other cucurbits, peanuts, wheat, rice and corn. The compounds are particularly effective on grape plants. The compounds are applied to the florets, foliage, or both at the time of anthesis, at growth regulating amounts which vary from 50 to 2,000 p.p.m.

DESCRIPTION OF THE INVENTION

The plant-growth-regulant biurets in this invention can be represented by the structure

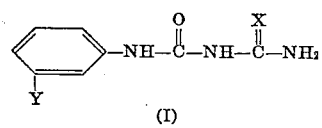

wherein
X is oxygen or sulfur; and
Y is fluorine, hydrogen or methyl.

Thus the following compounds are included in structure (I): 1-m-fluorophenylbiuret; 1-phenylbiuret; 1-m-tolyl-biuret; 1-m-fluorophenyl-4-thioburet; 1-phenyl-4-thio-biuret; and 1-m-tolyl-4-thiobiuret.

The compounds of structure (I) can be prepared by art-known methods. For example, the compounds wherein X is oxygen can be prepared by the reaction of nitrobiuret with the appropriate aniline:

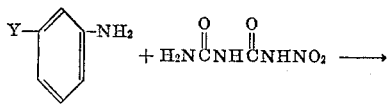

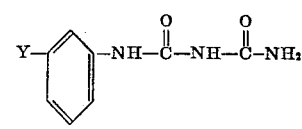

the compounds wherein X is sulfur can be prepared by the reaction of thiourea with the appropriate isocyanate:

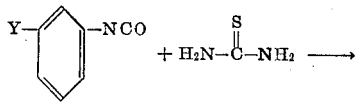

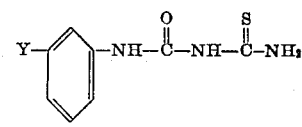

When the compounds are used to increase the yield of plants, particularly grape plants, by increasing the number and size of fruit set, they should be applied to the florets or foliage, or both, at the time of anthesis. Preferably, the applications are made two or three times, spaced at approximately weekly intervals beginning at early anthesis. For plants that bloom over an extended period, the number of applicants may be increased or the application or applications timed to correspond to the time of maximum bloom and/or fruit set. The rates of applications vary from 50 to 2,000 p.p.m. depending on the time, method of application and the crop. For floral dips, the lower rates are preferred, while the higher rates are employed for overall sprays. For floral dips the preferred rates are 50 to 500 p.p.m., while 500 to 2,000 p.p.m. are preferred for the spray applications.

For small scale experimental use, the biurets can be applied as a spray from a simple solution in a nonphytotoxic solvent. Such materials as ketones, chlorinated hydrocarbons, esters, amides, ethers, and the like are suitable. For larger scale application, it is most convenient to apply aqueous sprays. Preferred concentrates for aqueous sprays are wettable powders containing 10 to 90% of the biuret and finely ground aqueous suspensions containing 10 to 60% of the biuret. Application of dusts is feasible and such dusts can contain from 1% to 30% of the biuret and, in the simplest case, 70 to 99% inert diluent. The greater accuracy of spray application generally gives an advantage over dust application.

Emulsifiable concentrates can also be prepared by choice of suitable inert, water-immiscible solvents for the active ingredient and suitable emulsifiers. Due to the relative insolubility of the biurets in common water-immiscible solvents, however, the active ingredient content of such emulsifiable concentrates is generally below 25% and emulsifier levels in the range of 3 to 10% are usually needed. Thus, the more concentrated wettable powders and aqueous suspensions offer an economic advantage.

Wettable powders will ordinarily contain 10–90% of the biuret, 1–8% surfactant or surfactant mixture, and 2–89% inert solid diluent. They can also contain minor amounts of corrosion inhibitors, antifoam agents, coloring materials, anti-caking agents, stabilizers, etc. The surfactants may be cationic, anionic or nonionic. A detailed list of surface active agents is set forth in "Detergents and Emulsifiers, 1968 Annual" by John W. McCutcheon, Inc. Anionic and nonionic surfactants are preferred and preferred anionic surfactants are alkali metal salts of alkylarylsulfonic acids such as dodecylbenzenesulfonic acid and alkylnaphthalenesulfonic acid; fatty alcohol sulfates, such as sodium lauryl sulfate; dialkyl sodium sulfosuccinates, particularly the dioctyl ester; and sodium dodecyldiphenyl ether disulfonate. Preferred nonionic surfactants are alkylphenoxy poly(ethyleneoxy)ethanols such as the ethylene oxide adducts with octyl-, nonyl- and dodecylphenol; alkanol polyethylene glycol adducts such as the trimethylnonyl polyethyleneglycol ethers; and polyethylene adducts with fatty acids, rosin acids, long chain alkyl mercaptans, sorbitan fatty acid esters or polypropylene oxides. Frequently the wettable powder will contain in addition to a wetting surfactant, an additional surfactant chosen for excellent dispersant activity. Preferred dispersants are alkali metal and alkaline earth salts of ligninsulfonic acids and polymeric alkylnaphthalenesulfonic acids; methyl cellulose; and polyvinyl alcohol.

Suitable inert solid diluents include the nautral clays, e.g., attapulgite, kaolinite, diatomaceous earth, pyrophyllite, talc, synthetic mineral fillers such as the synthetic fine silicas and calcium or magnesium silicates, carbonates, phosphates and sulfates; and flours derived from natural sources such as walnut shell, redwood, cotton seed, and the like. The wettable powders can be prepared by blending the ingredients and, ordinarily, by grinding them to produce fine particles which will give good biological activity and suspension characteristics in the final product.

Aqueous suspension concentrates will ordinarily contain from 10 to 60% of the finely divided biuret in an aqueous medium. They may also contain surfactants and solid inert diluents as described above, viscosity modifiers, thickeners or suspensing agents such as gelling clays or hydrophilic polymers, and anti-freeze agents. Minor amounts of anti-microbial agents may also be included for stability. The suspension concentrates are prepared by sand grinding or ball milling, or by mechanical dispersion of very finely ground material in water. The particles in such concentrates are generally below 5 microns in diameter.

When it is desired to apply the biuret with relatively large amounts of surfactants, it is more convenient to add the additional surfactant directly to the spray tank.

It is particularly advantageous to combine the compounds of the invention with gibberellic acid for application to fruits, especially grapes. The combination of 100–500 p.p.m. of the biuret and 10–80 p.p.m. of gibberellic acid when applied to grapes and other fruits gives a greater yield of fruit than with the biuret treatment alone.

The invention will now be exemplified by the following examples, in which parts by weight are used unless otherwise indicated.

EXAMPLE 1

Preparation of 1-m-fluorophenylbiuret

To a solution of 8 parts of nitrobiuret in 100 parts of a 1:1 mixture of dioxane and water is added 6 parts of m-fluoroaniline and the resulting mixture is stirred for one hour. The mixture is heated to reflux for 5 hours and then cooled. Upon addition of water, a solid separates. It is filtered, washed with water, and dried to give 8 parts, M.P. 133–145° C. Crystallization from ethanol gives 5.5 parts of 1-m-fluorophenylbiuret, M.P. 152–154° C.

EXAMPLE 2

Preparation of 1-m-fluorophenyl-4-thiobiuret

A mixture of 6.85 parts of m-fluorophenyl isocyanate and 3.8 parts of thiourea is heated on a steam bath for 5 hours. The solid white residue is washed with hexane, dried, and recrystallized from aqueous methanol to give 3.0 parts of 1-m-fluorophenyl-4-thiobiuret, M.P. 192–193° C.

EXAMPLE 3

| | |
|---|---|
| 1-m-fluorophenylbiuret | 50 |
| Dioctyl sodium sulfosuccinate | 0.5 |
| Partially desulfonated sodium lignin sulfonate | 3 |
| Attapulgite | 46.5 |

The ingredients are blended, passed through a fluid energy mill to produce particles essentially all below 20 microns, reblended, sifted through a U.S.S. #50 sieve (0.3 mm. opening) and packaged. This wettable powder is dispersed in water for spray application. One part of this powder can be diluted with 4 parts of talc to produce a 10% dust.

EXAMPLE 4

| | |
|---|---|
| 1-m-fluorophenylbiuret | 80 |
| Alkylarylpolyether alcohol (40% on magnesium carbonate) | 2 |
| Low viscosity methyl cellulose | 2 |
| Silica aerogel | 1 |
| Kaolinite | 15 |

The ingredients are blended, passed through a hammer mill to produce particles essentially all below 50 microns, reblended, sifted through a U.S.S. #50 sieve (0.3 mm. opening) and packaged. This wettable powder is dispersed in water for spray application.

EXAMPLE 5

| | |
|---|---|
| 1-m-fluorophenylbiuret | 35 |
| Sodium ligninsulfonate | 5 |
| Hydrated attapulgite | 1 |
| Sodium pentachlorophenate | 0.5 |
| Water | 58.5 |

The ingredients are mixed together and sand-milled until substantially all the particles of active ingredient are below 5 microns. The slurry is passed through a U.S.S. #50 sieve (74 microns opening) and packaged. This aqueous concentrate can be extended with water for spray application.

EXAMPLE 6

1-m-fluorophenylbiuret, formulated as a wettable powder, is suspended in water at a concentration of 1,000 p.p.m. and 0.25% (w./w.) "Tween" 20 (polyoxyethylene sorbitan monolaurate) wetting agent added. Three applications of this material spaced four days apart are made to Fredonia grape vines beginning at early anthesis. This treatment results in a larger set of grapes and an increase in the weight of many of the bunches on the treated vines. When harvested in the fall the treated vines yield more grapes than similar untreated ones.

EXAMPLE 7

A suspension containing 200 p.p.m. of 1-m-fluorophenylbiuret, formulated as described in Example 5 and containing 0.5% of B–1956 wetting agent (modified phthalic glycerol alkyd resin), is prepared. Developing grape flowers are covered with this solution by dipping, spraying or smearing it on them. This treatment is repeated five days later. This treatment results in a larger set of grapes and more large-sized bunches on the treated plants. Consequently, more grapes are harvested from the treated vines than from similar untreated plants.

EXAMPLE 8

Suspensions containing 500 and 1,000 p.p.m. of 1-m-fluorophenylbiuret and 0.25% by weight of polyoxyethylene sorbitan monolaurate in water were prepared from a wettable powder formulation of the chemical. These suspensions were sprayed on Fredonia grape plants to the point of runoff at the beginning of anthesis, taking care to throughly wet the leaves, stems and flower clusters. The treatment was repeated at weekly intervals for a total of three times. Six replicates were made. The untreated controls were sprayed with a water containing the 0.25% of polyoxyethylene sorbitan monolaurate (a wetting agent). The grape vines are maintained normally treated and harvested when ripe. The average yields from the treatments are shown in the table below:

TABLE

| Treatment | Rate, p.p.m. | Mean yields per vine as percent of control | Weight per bunch as percent of control |
|---|---|---|---|
| 1-m-fluorophenylbiuret | 500 | 215 | 168 |
| Do | 1,000 | 266 | 189 |
| Control (treated with wetting agent only) | | 100 | 100 |

EXAMPLE 9

A 300 p.p.m. suspension of m-fluorophenylbiuret was prepared and 0.5% "Tween" 20 wetting agent was added to it. Sufficient gibberellic acid was added to provide a concentration of 40 p.p.m. A solution containing only the gibberellic acid and wetting agent was also prepared.

The suspension was applied to developing grape flowers at anthesis by dipping the flowers in it. The treatment was repeated seven and fourteen days later. Other grape vines were treated at the same times with the gibberellic acid solution. The weight of grapes per bunch shown in the table below is the average of four replicates.

TABLE

| Treatment | Rate, p.p.m. | Weight per bunch as a percent of control |
|---|---|---|
| m-Fluorophenylbiuret plus gibberellic acid | 500+40 | 135 |
| Gibberellic acid | 40 | 75 |
| Control (treated with wetting agent only) | | 100 |

EXAMPLE 10

A suspension is formed containing 500 p.p.m. of 1-m-fluorophenyl-4-thiobiuret and 0.25% by weight of "Triton B-1956" wetting agent (modified phthalic glycerol alkyd resin). This suspension is sprayed to runoff on Chardonnay wine grape vines at the time of anthesis. The treatment is repeated five and ten days after the initial treatment.

This treatment causes an increase of 15 to 20% in the berry size when this grape variety is harvested.

EXAMPLE 11

A 1,000 p.p.m. suspension of 1-m-tolylbiuret containing 0.2% by weight of polyoxyethylene sorbitan monolaurate wetting agent ("Tween" 20) is prepared. This suspension is sprayed to runoff on Chenin Blanc grapes at anthesis. A second application is made 10 days later.

The treatment increases the average size of the grape by 25% or more.

EXAMPLE 12

A suspension containing 1,000 p.p.m. of a wettable powder formulation of 1 - phenylbiuret and 0.25% of "Tween" 20 (polyoxyethylene sorbitan monolaurate) in water is prepared. This solution is sprayed on Fredonia grapes to the point of runoff at early anthesis. The treatment is repeated one and two weeks later.

As a result of these treatments, the grapes have tighter more compact branches that have more berries per bunch than similar untreated vines. The treated vines yield more total weight of grapes than similar untreated ones.

EXAMPLE 13

A suspension containing 1000 p.p.m. of the 1-m-fluorophenylbiuret and 0.25% "Triton B-1956" wetting agent (modified phthalic glycerol alkyd resin) when applied to Elberta peaches at weekly intervals for three applications beginning at anthesis will result in larger peaches.

EXAMPLE 14

A suspension containing 500 p.p.m. of 1 - m-fluorophenylbiuret and 0.2% "Tween 20" wetting agent (polyethylene sorbitan monolaurate) is applied to blueberry plants at anthesis. A second application is made ten days later. The treatment results in an increase in fruit set and an improvement in the yield of fruit.

EXAMPLE 15

Three applications beginning at anthesis of a suspension containing 300 p.p.m. of 1-m-fluorophenylbiuret and 0.25% of "Tween 20" or other nonphytotoxic wetting agent are made to red delicious apple trees at weekly intervals beginning at early anthesis. The blossoms and young foliage are sprayed to runoff with the suspension. The treatment will result in an increase in fruit set and higher yields when the trees are harvested in the fall.

EXAMPLE 16

Strawberries are treated with an application of 750 p.p.m. of 1-m-fluorophenylbiuret as a suspension in water containing 0.2% "B-1956" wetting agent at the time they are in early flower. This treatment will increase the average berry size and the total yield of berries.

EXAMPLE 17

A suspension containing 500 p.p.m. of 1-m-fluorophenylbiuret and 0.1% "Tween 20" wetting agent is applied to soybeans at the time the third trifoliate leaf is expanding. A second application is made at the time 5 to 10% of the plants are showing their first flower. The plants are sprayed to runoff with the suspension. The treatment causes the set of most pods on the plants and, therefore, will increase the yield of beans when they are harvested.

EXAMPLE 18

Tomatoes 6 to 8 inches tall and well established are sprayed with a 300 p.p.m. suspension of 1-m-fluorophenylbiuret to the point of runoff. A second application is made two weeks later. The treatment promotes the set of fruit on the treated tomatoes and they yield a larger crop of early fruit. This early fruit will command a premium when sold.

EXAMPLE 19

A suspension containing 1 kg. of 1-(m-fluorophenyl)-biuret and 0.5% "Tween 20" in 250 l. of water is prepared and sprayed on a hectare of wheat one week after full bloom. This treatment causes the wheat plants to retain their chlorophyll longer than untreated plants. As a result they continue to carry on photosynthesis and store more material in the seeds, resulting in an increase in wheat compared to an adjacent hectare when the field is harvested.

EXAMPLE 20

A suspension of 0.5 kg. of 1-(m-fluorophenyl)-biuret and 0.5% "Tween 20" in 200 l. of water is prepared and sprayed on a hectare of silage corn one week after full tassel. This treatment is repeated at weekly intervals for a total of three treatments. These treatments delay senescence, prolong the activity of chlorophyll in the treated corn and result in a higher yield of in terms of dry weight and total digestible nutrients compared to a similar hectare of untreated corn.

EXAMPLE 21

A suspension containing 1 kg. of 1-(m-fluorophenyl)-biuret and 0.4% of B-1956 wetting agent in 100 l. of water is prepared and sprayed on a hectare of paddy rice approximately four weeks after anthesis. A helicopter is used to make the application. This treatment delays the senescence in the rice and prolongs the activity of the chlorophyll in the leaves, resulting in an increase in grain yield over the untreated portion of the field.

The compounds can also be used to prolong the life of harvested green leafy vegetables.

When the compounds are applied for this use, they are applied to the vegetables as a foliar spray before harvest or as a dip or spray treatment after harvest. Rates of 1 to 200 p.p.m. are suitable for this use with rates of 50 to 100 p.p.m. preferred.

This use is illustrated by the following examples.

EXAMPLE 22

A suspension containing 100 p.p.m. of 1-m-fluorophenylbiuret in water with 0.5% "Tween 20" is prepared and sprayed on a field of lettuce a few days prior to harvest. This treatment delays the yellowing of the lettuce and other changes associated with post-harvest deterioration. As a result the lettuce arrives to the ultimate consumer in better condition and can be stored longer before use.

EXAMPLE 23

A suspension containing 1 p.p.m. of 1-m-fluorophenylbiuret is prepared and freshly harvested lettuce heads are dipped in it for one minute. This treatment prolongs the storage life of the treated lettuce by delaying the loss of green color and other changes that occur after the lettuce is harvested.

What is claimed is:
1. A method for improving the yield of fruits from plants comprising applying to said plants at anthesis a growth regulating amount of a 1-arylbiuret of the formula:

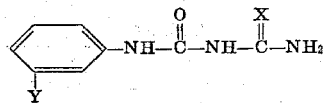

wherein
Y is fluorine, hydrogen or methyl; and
X is oxygen or sulfur.
2. The method of claim 1 wherein the 1-arylbiuret applied is 1-m-fluorophenylbiuret.

References Cited
UNITED STATES PATENTS

| | | | |
|---|---|---|---|
| 3,253,902 | 5/1966 | Munz | 71—120 |
| 3,556,766 | 1/1971 | Mitchell | 71—120 |

JAMES O. THOMAS, Jr., Primary Examiner

U.S. Cl. X.R.
71—99